United States Patent [19]

Melara

[11] 4,077,088
[45] Mar. 7, 1978

[54] TWO WHEEL CASTOR PARTICULARLY FOR FURNITURE

[76] Inventor: Francescantonio Melara, Via Ferrarese, 8, Bologna, Italy

[21] Appl. No.: 724,181

[22] Filed: Sep. 17, 1976

[30] Foreign Application Priority Data

Sep. 22, 1975 Italy .................................. 27500/75

[51] Int. Cl.² ............................................. B60B 33/00
[52] U.S. Cl. ................................................... 16/47
[58] Field of Search ....................... 16/45–48, 16/31 R, 31 A, 18 R, 18 A

[56] References Cited

U.S. PATENT DOCUMENTS 3,177,516  4/1965  Price et al. ....................... 16/18 A

FOREIGN PATENT DOCUMENTS 2,254,446  7/1975  France ................................... 16/47
1,299,583  12/1972  United Kingdom .............. 16/18 A

*Primary Examiner*—Dorsey Newton
*Attorney, Agent, or Firm*—Guido Modiano; Albert Josif

[57] ABSTRACT

A castor for items of furniture has two coaxial wheels and comprises a cowling having the shape of a tubular horizontal axis half cylinder subdivided by a diaphragm perpendicular to the cowling. Each wheel is provided with an axial tubular tail piece of snap-action engageable with and freely pivotable in a sort of annular resilient clamp formed frontally to the diaphragm.

1 Claim, 3 Drawing Figures

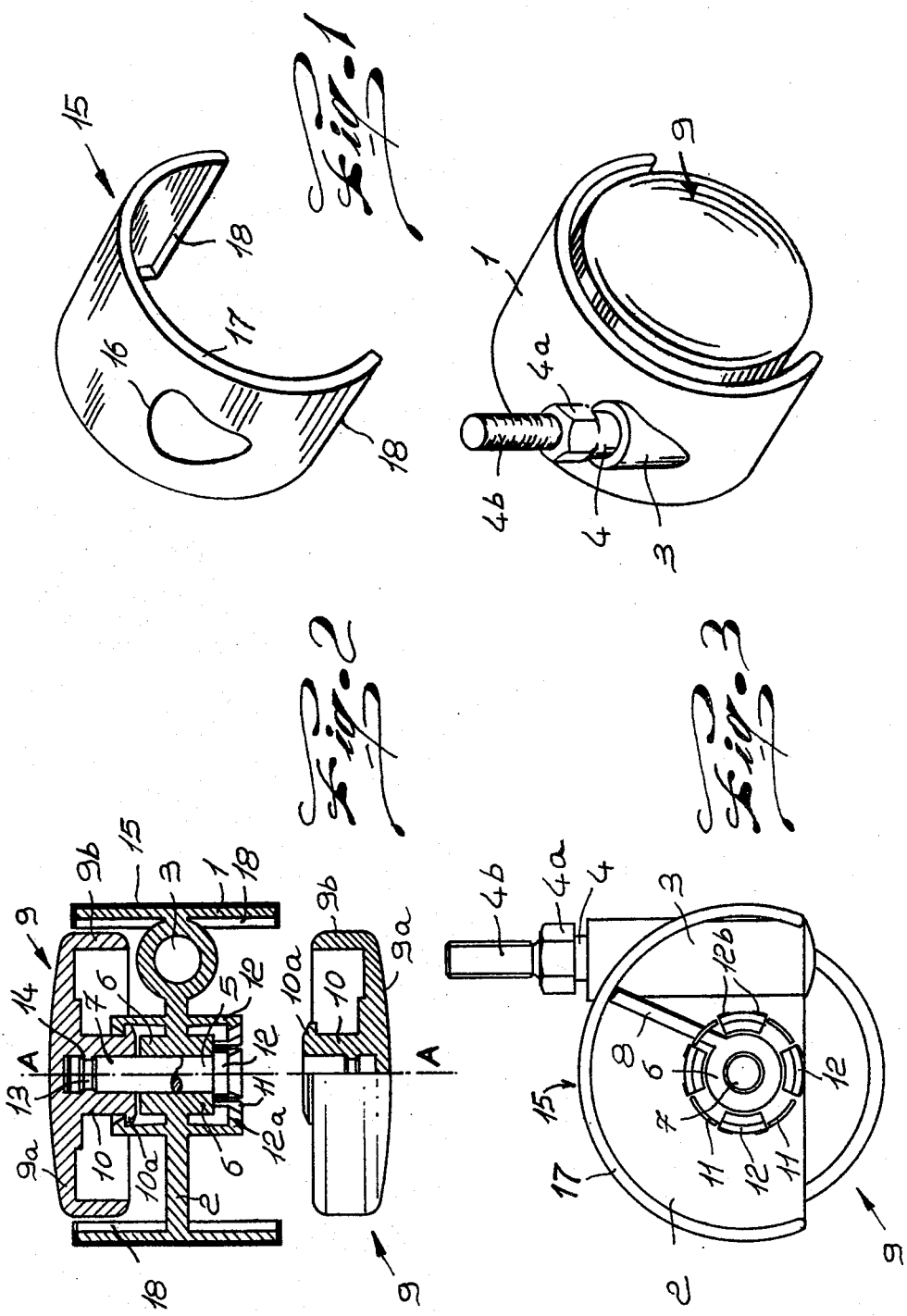

TWO WHEEL CASTOR PARTICULARLY FOR FURNITURE

BACKGROUND OF THE INVENTION

This invention relates to a castor for furniture items, having two co-axial wheels.

In the prior art castor, the wheels were mounted fixedly to a horizontal axle, whereby after a short period of use of the castor, hair, threads and other hard to remove materials collected therebetween, which definitely impeded the wheel rolling capacity and, accordingly, the castor operation.

SUMMARY OF THE INVENTION

This invention is aimed at obviating the above cited drawback.

This object is achieved by the instant furniture castor of the kind comprising a vertical wall, a cylindrical seat formed in said wall perpendicularly thereto and defining front bushings on both sides of said wall, a spindle rotatably supported in said seat and having its opposite ends projecting out of said seat on both sides thereof, a pair of wheels secured on said opposite ends and having tubular hub portions provided with outer collars close to said front bushings, a sleeve formed in said wall in the same plane thereof and perpendicular to and laterally offset from said spindle for rotatably supporting a pivot pin adapted to be located in a vertical socket of the article to which the castor is to be fitted, a plurality of hook members provided on both sides of said wall and concentrically arranged around said spindle so as to define regular interspaces, said hook members having inwardly projecting lips engaging said collars for axially retaining said wheels, wherein according to the improvement between adjacent hook members tabs are provided axially extending from both sides of said wall and such as to close the interspaces existing between said adjacent hook members, the free ends of said tabs projecting above said collars.

BRIEF DESCRIPTION OF THE DRAWING

Further features will be more apparent from the following description of one embodiment of the invention, shown in the accompanying drawing, where:

FIG. 1 is a perspective general view, partially exploded, of the castor according to this invention;

FIG. 2 shows an axial horizontal cross-sectional view of that same castor; and

FIG. 3 is an elevational view and side view of the instant castor, with the wheels removed.

DESCRIPTION OF THE PREFERRED EMBODIMENTS

Making reference in particular to the drawing figures, the numeral 1 denotes the castor cowling, which forms slightly more than one half of the lateral surface of a cylinder, having a horizontal axis A—A and its convex part facing upwards. Within the cowling 1 concavity, and integral therewith, a vertical diaphragm or wall 2 is provided which lays in a centerplane normal to the axis A—A with respect to the cowling.

In the diaphragm 2, there is configurated a sort of closed end vertical sleeve 3 which projects above the cowling 1 and tangent internally to the cowling and located at a distance from the axis A—A. The sleeve 3 supports pivotally a vertical pivot pin 4 of the castor, which is formed, above the sleeve 3, with a prismatic portion 4a and a threaded end portion 4b for the mounting of the castor to the piece of furniture. The pivot pin 4 being offset with respect to the axis A—A, the castor plane of rotation is automatically stabilized as the piece of furniture is moved about. Co-axial with the axis A—A, the diaphragm 2 includes a through cylindrical seat 5, which defines front bushings 6 on the opposite sides of the diaphragm. A horizontal pin or spindle 7 is rotatably supported in that seat. On each side of the diaphragm 2, a radial reinforcing rib 8 extends from the corresponding bushing 6 to the sleeve 3 point of attachment to the cowling 1.

The twin wheels of the castor, denoted with the numeral 9, comprise a circular wall 9a, slightly crowned outwardly, and a peripheral ring 9b facing to the inside. At the wall 9a center, each wheel 9 is provided with a tubular hub portion projecting to the inside, for engagement with its respective end of the horizontal pin 7. The portion 10 of each wheel 9 ends in an outer collar 10a which is tapered outwardly such as to form a sort of hook adapted to be snap action inserted in a sort of annular clamp projecting frontally from the corresponding side of the diaphragm 2. The clamp is comprised of a set of flexible tabs 11 intermingled with a set of hook members 12. The tabs close the interspaces between the hook members and extend over the collars 10a. The tabs 11, and the hook members 12, are arranged concentrically around their respective bushings 6. The hook members 12 are provided externally with small ribs 12b and terminate in a lip 12a, projecting inwardly to the inside and beveled such as to favor the penetration of the portion 10. After the portion 10 has gone through the respective clamp 11-12, the wheel 9 is prevented from sliding out axially by the collar 10a engagement behind the lips 12a, while being free to rotate.

It will be understood that, prior to the insertion of the hub portions 10 of the twin wheels 9 into the resilient clamps 11-12, the horizontal pin 7 is first installed in the seat 5, thereby the wheels are engaged with the pin and clamps in one quick operation. It should be noted that, to achieve a better retaining action on the wheels, there are provided close to the ends of the pin 7 respective annular groove 13, wherein annular projections 14 are engaged which are provided inside the tubular portions 10.

It will thus appear how the wheel 9 bearing areas in the diaphragm 2 are effectively protected from hair, threads, etc., thereby the castor will not suffer failure in its rolling, and will offer positive operation features and long life.

While the pins 4 and 7 are of metal, the cowling 1, diaphragm 2 and related appendages, and wheels 9 are all molded from a plastic material, preferably from a material commercially available under the tradename Nylon. When it is desired to give the cowling a metallic appearance, provision is made for applying a metal sheet cover 15 thereto. The cover 15 has the same shape as the cowling 1 and is formed with a contoured bore 16 to fit around the sleeve 3. The cover is secured to the cowling by folding the tongues 18 of the cover under the lower edges of the cowling. The front edges of the cowling are suitably concealed by further laps 17.

I claim:

1. A castor of the kind comprising a vertical wall, a cylindrical seat formed in said wall perpendicularly thereto and defining front bushings on both sides of said wall, a spindle rotatably supported in said seat and having its opposite ends projecting out of said seat on both sides thereof, a pair of wheels secured on said opposite ends and having tubular hub portions provided with outer collars close to said front bushings, a sleeve formed in said wall in the same plane thereof and perpendicular to and laterally offset from said spindle for rotatably supporting a pivot pin adapted to be located in a vertical socket of the article to which the castor is to be fitted, a plurality of hook members provided on both sides of said wall and concentrically arranged around said spindle so as to define regular interspaces. said hook members having inwardly projecting lips engaging said collars for axially retaining said wheels, wherein according to the improvement between adjacent hook members tabs are provided axially extending from both sides of said wall and such as to close the interspaces existing between said adjacent hook members, the free ends of said tabs projecting above said collars.

* * * * *